Feb. 7, 1956 P. J. M. T. ALLARD 2,733,963
DEVICE FOR AIDING THE DISPLACEMENT
OF VEHICLES OVER LOOSE GROUND
Filed April 14, 1953 2 Sheets-Sheet 1
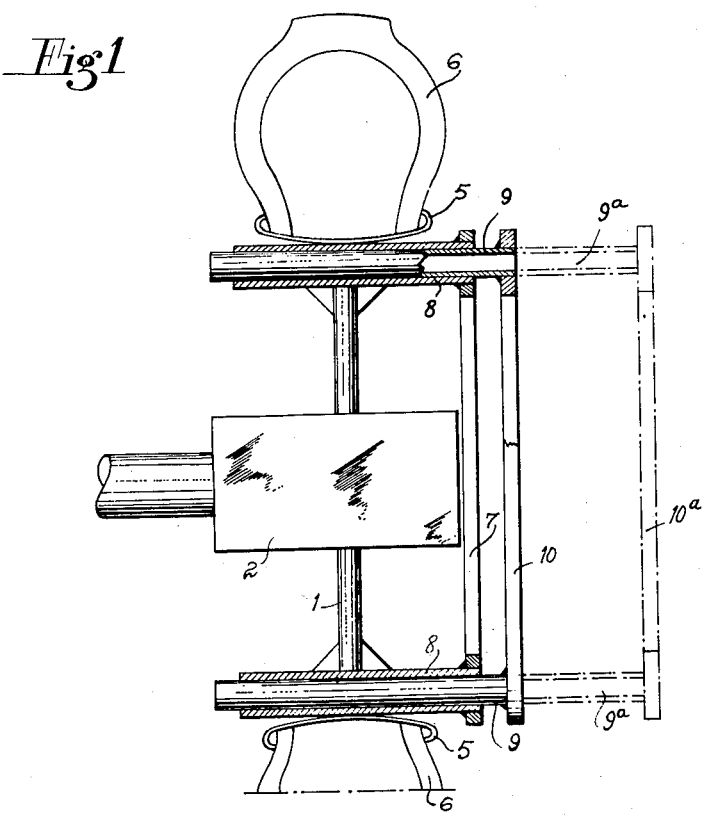
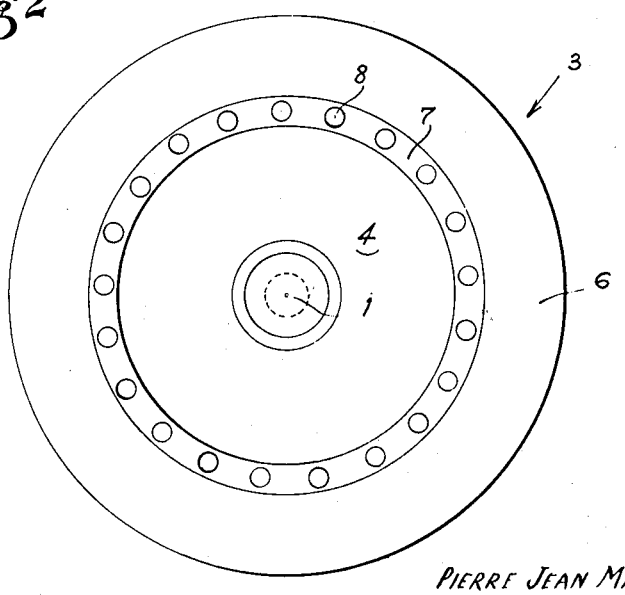
INVENTOR:
PIERRE JEAN MARIE THEODORE ALLARD
By
Richardson, David and Nordon
ATTYS INVENTOR:
PIERRE JEAN MARIE THÉODORE ALLARD
BY
Richardson, David and Nordon
ATTY's

United States Patent Office 2,733,963
Patented Feb. 7, 1956

2,733,963

DEVICE FOR AIDING THE DISPLACEMENT OF VEHICLES OVER LOOSE GROUND

Pierre Jean Marie Theodore Allard, Eaubonne, France

Application April 14, 1953, Serial No. 348,716

Claims priority, application France April 19, 1952

8 Claims. (Cl. 301—41)

It is well known that vehicles having wheels provided with pneumatic tyres travel with difficulty over loose ground. Even when the tyres employed are of special type suitable for such a surface the wheels often sink into the ground and their adherence to the latter is very poor.

The object of the present invention is to provide a device adapted to aid the displacement of vehicles over loose ground while avoiding the use of tyres specially provided for this type of surface. This device is extremely simple and presents the advantage of not increasing the bearing surface of the vehicle on normal grounds since it may be withdrawn into the wheel when not needed.

The device in accordance with the invention comprises a cage or barrel composed of tubes disposed in an annulus integral with the rim of the wheel, a cylindrical member slidably mounted in each of these tubes, these cylindrical members being connected together on their outer ends by a ring and being adapted to be partially withdrawn from the tubes in which they are slidable whereby they constitute with said ring an additional bearing surface for the vehicle so that the latter may bear upon the ground when the tyres of the wheels are entirely embedded in the ground owing to the looseness of the latter.

According to a modification, several tubes may be assembled telescopically one inside the other.

According to another modification, several cages or barrels of tubes having different diameters may be disposed coaxially with the wheel, the length of the cylindrical members adapted to slide in these tubes, or the amount by which they may be withdrawn from these tubes, varying from one cage or barrel to another.

Preferably means are provided for maintaining the bars and in one embodiment of the invention the sliding tubes too, in their pushed-in and pulled-out positions. These means may be of any type, for example conveniently the bars and sliding tubes may be a suitably tight sliding fit in their conjugate member so that the friction therebetween thus obtained maintains the bars and tubes in position.

Figure 3:
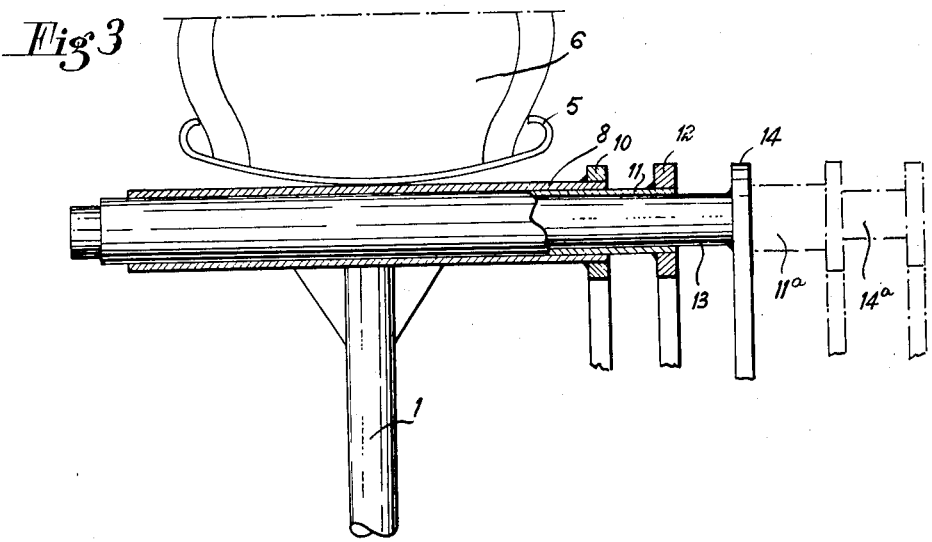
Figure 4:
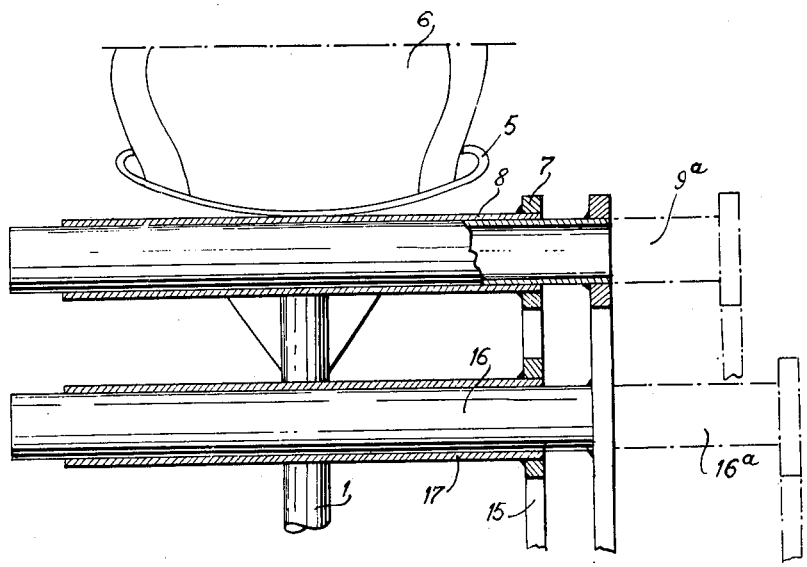

Other features and advantages will be apparent from the ensuing description with reference to the accompanying drawings, in which:

Fig. 1 represents diagrammatically and partially in section, a wheel provided with the device according to the invention, this device being shown in full lines in its inactive position i. e. when it is push into the cage of tubes. The dotted lines show the device in its active, or extended, position, Fig. 2 represents, diagrammatically, the wheel shown in Fig. 1 viewed in the axial direction, the slidable cylindrical members having been removed, and Figs. 3 and 4 represent diagrammatically two modifications of the device according to the invention.

In the embodiment shown in Figs. 1 and 2, spokes 1 and a hub 2 carry a wheel 3 the rim 5 of which carries a ring 7 fixed immediately adjacent thereto. A tyre 6 is mounted on the rim 5. In this ring 7 are disposed, equally spaced apart, tubes 8 made integral with the ring, for example, by welding. In each of these tubes is slidably mounted a hollow or solid bar 9 and each bar is attached to the remaining bars exteriorly of the ring 7 by a ring 10. Maintaining means are provided (not shown in the drawing) for maintaining the bars 9 inside the tubes 8 when they are in their pushed-in position i. e. in their position when not being used. As mentioned above, these means may be frictional.

The device according to the invention is very simple to use. When the vehicle is about to traverse loose ground, the bars 9 are released from the locking means which normally maintain them inside the tubes 8, and the ring 10 is pulled outwards until it assumes the position shown at 10$^a$ in Fig. 1, the bars 9 then occupy the position shown at 9$^a$. When the ring 10 is in position 10$^a$ the bars 9 are locked in their new position 9$^a$ by locking means (not shown in the drawing).

As soon as the tyres 6 are completely embedded in the soil, the bars 9$^a$ and the ring 10$^a$ come into contact with the latter and thereby constitute an additional support which aids the advance of the vehicle. Under these conditions it is quite unnecessary to employ conventional large-section tyres suitable for loose ground. It is in fact preferable not to use this type of tyre if the vehicle is equipped with the device according to the invention, since a normal-section tyre sinks more quickly into the ground and the device according to the invention enters into operation before it would do if a large-section tyre were employed.

A sufficient distance is, of course, arranged between the various bars 9 to prevent lumps of earth from wedging themselves therebetween or filling the interior of the cage constituted by these bars.

Two modifications of the invention are illustrated in Figs. 3 and 4.

In the device shown in Fig. 3, the bars 9, which are slidably mounted in the tubes 8, are replaced by tubes 11. These tubes 11 fulfill exactly the same function as the bars 9 in Figs. 1 and 2 and are connected together by a ring 12. Inside each tube 11 is slidably mounted a bar 13, the relationship between the latter and the tube 11, being exactly similar to that between the tube 11 and the tube 8. The bars are connected together by means of a ring 14. The positions the bars 13 and the tubes 11 occupy when the device is being employed are shown at 13$^a$ and 11$^a$ respectively in Fig. 3. The foothold or grip of the vehicle on the ground is in this modification further improved.

The device illustrated in Fig. 4 represents another modification of the invention which attains a similar result in another manner. Two rings 7 and 15 are provided, the ring 7 being disposed immediately adjacent the rim 5 whereas the ring 15, concentric with this ring 7, is nearer the wheel hub. The bars slidably mounted inside one set of tubes are adapted to emerge a greater distance from their tubes than those mounted in the other tubes. Thus the bars 16 slidably mounted in the tubes 17 attain position 16$^a$ in their pulled-out position, whereas the bars 9 slidably mounted in the tubes 8 and connected to the ring 7 attain position 9$^a$. The bars 16 do not come into contact with the ground, therefore, until the bars 9 are already embedded therein.

A noteworthy feature of the device according to the invention is that the bars or tubes have a tendency to bite into the ground and act somewhat like a pinion on a rack. This effect materially improves the grip of the wheels in the soil.

The invention is not limited to the constructional details herein described and illustrated in the accompanying drawings which have been given merely by way of example. Thus, the number of movable rings might be greater than two, and the bars 16 might be longer than the bars 9.

Having now described my invention what I claim as new and desire to secure by Letters Patent is:

1. A vehicle wheel suitable for loose ground comprising: a wheel rim on which is mounted a tyre, a series of tubes arranged in an annulus coaxial with the axis of rotation of said wheel and rigidly secured to said rim, a sliding member slidably mounted in each of said tubes, a ring rigidly connecting said sliding members, said sliding members being adapted to slide in said tubes between a pushed-in position where said sliding members are contained inside said tubes over substantially their whole length and a pulled-out position where said sliding members are substantially withdrawn from said tubes, whereby when said sliding members are in their pulled-out position they constitute an additional bearing surface for said wheel when said tyre has sunk into loose ground.

2. A vehicle wheel suitable for loose ground comprising: a wheel rim on which is mounted a tyre, a series of tubes integral with and spaced around said rim and disposed parallel to the axis of rotation of said wheel, a sliding member slidably mounted in each of said tubes, a ring rigidly connecting said sliding members, said sliding members being adapted to slide in said tubes between a pushed-in position where said sliding members are contained inside said tubes over substantially their whole length and a pulled-out position where said sliding members are substantially withdrawn from said tubes, whereby when said sliding members are in their pulled-out position they constitute an additional bearing surface for said wheel when said tyre has sunk into loose ground.

3. In a vehicle wheel, the combination of: a wheel rim on which is mounted a tyre, a series of tubes arranged in an annulus coaxial with the axis of rotation of said wheel and rigidly secured to said rim, a sliding member slidably mounted in each of said tubes, a ring rigidly connecting said sliding members, said sliding members being adapted to slide in said tubes between a pushed-in position where said sliding members are contained inside said tubes over substantially their whole length and a pulled-out position where said sliding members are substantially withdrawn from said tubes, whereby when said sliding members are in their pulled-out position they constitute an additional bearing surface for said wheel when said tyre has sunk into loose ground.

4. In a vehicle wheel, the combination of: a wheel rim on which is mounted a tyre, a series of tubes integral with and spaced around said rim and disposed parallel to the axis of rotation of said wheel, a sliding member slidably mounted in each of said tubes, a ring rigidly connecting said sliding members, said sliding-members being adapted to slide in said tubes between a pushed-in position where said sliding members are contained inside said tubes over substantially their whole length and a pulled-out position where said sliding members are substantially withdrawn from said tubes, whereby when said sliding members are in their pulled-out position they constitute an additional bearing surface for said wheel when said tyre has sunk into loose ground.

5. A vehicle wheel suitable for loose ground comprising: a wheel rim on which is mounted a tyre, a series of first tubes arranged in an annulus coaxial with the axis of rotation of said wheel and rigidly secured to said rim, a second tube slidably mounted in each of said first tubes, a ring rigidly connecting said second tubes, said second tubes being adapted to slide in said first tubes between a pushed-in position where said second tubes are contained inside said first tubes over substantially their whole length and a pulled-out position where said second tubes are substantially withdrawn from said first tubes, means for holding said second tubes in their pushed-in and pulled-out positions respectively, a sliding member slidably mounted in each of said second tubes, a ring rigidly connecting said sliding members, said sliding members being adapted to slide in said second tubes between a pushed-in position where said sliding members are contained inside said second tubes over substantially their whole length and a pulled-out position where they are substantially withdrawn from said second tubes, whereby when said second tubes and said sliding members are in their respective pulled-out positions they constitute an additional bearing surface for said wheel if said tyre sinks into loose ground.

6. A vehicle wheel suitable for loose ground comprising: a wheel rim on which is mounted a tyre, a series of first tubes integral with and spaced around said rim and disposed parallel to the axis of rotation of said wheel, a second tube slidably mounted in each of said first tubes, a ring rigidly connecting said second tubes, said second tubes being adapted to slide in said first tubes between a pushed-in position where said second tubes are contained inside said first tubes over substantially their whole length and a pulled-out position where said second tubes are substantially withdrawn from said first tubes, a sliding member slidably mounted in each of said second tubes, a ring rigidly connecting said sliding members, said sliding members being adapted to slide in said second tubes between a pushed-in position where said sliding members are contained inside said second tubes over substantially whole length and a pulled-out position where they are substantially withdrawn from said second tubes, whereby when said second tubes and said sliding members are in their respective pulled-out positions they constitute an additional bearing surface for said wheel if said tyre sinks into loose ground.

7. A vehicle wheel suitable for loose ground comprising, a wheel rim on which is mounted a tyre, a series of tubes arranged in a plurality of annuluses coaxial with the axis of rotation of said wheel and rigidly secured to said rim, a slidable member slidably mounted in each of said tubes, a ring provided for, and rigidly connecting the sliding members pertaining to, each annulus of tubes, said sliding members being adapted to slide between a pushed-in position where they are contained in said tubes substantially over their entire length and a pulled-out position where they are substantially withdrawn from said tube.

8. A vehicle wheel suitable for loose ground comprising, a wheel rim on which is mounted a tyre, a series of tubes integral with said rim and arranged in a plurality of annuluses coaxial with the axis of rotation of said wheel, a slidable member slidably mounted in each of said tubes, a ring provided for, and rigidly connecting the sliding members pertaining to, each annulus of tubes, said sliding members being adapted to slide between a pushed-in position where they are contained in said tubes substantially over their entire length and a pulled-out position where they are substantially withdrawn from said tubes.

References Cited in the file of this patent

UNITED STATES PATENTS 1,458,937    Hart _____ June 19, 1923